United States Patent Office 2,949,462
Patented Aug. 16, 1960

2,949,462

THIAZOLIDINE DERIVATIVES

Charles Ferdinand Huebner, Chatham, N.J., assignor to Ciba Pharmaceutical Products, Inc., Summit, N.J., a corporation of New Jersey No Drawing. Filed Jan. 26, 1959, Ser. No. 788,758

11 Claims. (Cl. 260—240)

The present invention relates to new thiazoline derivatives. More particularly, it concerns 2-phenyl-imino-3-phenyl-thiazolidines, in which one of the phenyl radicals contains in the 4-position a group of the formula $$Py-[C(R)=CH]_n-$$

in which Py stands for a pyridyl group, R for hydrogen, lower alkyl or monocyclic carbocyclic aryl, and $n$ represents a whole number from 0 to 2, and the other phenyl group contains in the 4-position an N,N-di-lower alkyl-amino-lower alkoxy group, or particularly an alkoxy group having from 4 to 5 carbon atoms, the salts thereof and mixtures of such compounds, as well as process for the preparation thereof.

A pyridyl radical stands for 3-pyridyl, 4-pyridyl, or especially 2-pyridyl radicals, which radicals may be unsubstituted or contain as additional substituents lower alkyl, e.g. methyl or ethyl; nitro or amino groups, or halogen atoms, e.g. chlorine or bromine. R represents primarily hydrogen; it may also stand for lower alkyl, e.g. methyl or ethyl. Furthermore, a monocyclic carbocyclic aryl radical, e.g. phenyl, or phenyl substituted, for example, by halogen, e.g. chlorine or bromine, or lower alkoxy, e.g. methoxy or ethoxy, may be anticipated as the radical R.

An N,N-di-lower alkyl-amino-lower alkoxy group is represented by 2-dimethylaminoethoxy or 2-diethylaminoethoxy. An alkoxy group having from 4 to 5 carbon atoms is represented by n-butyloxy, isobutyloxy, secondary butyloxy, n-pentyloxy, or isopentyloxy.

Salts of the new thiazolidine derivatives of this invention are particularly therapeutically acceptable acid addition salts, for example, those with inorganic acids, such as, hydrohalic acids, e.g. hydrochloric or hydrobromic acid; sulfuric or phosphoric acids; or those with organic acids, such as acetic, propionic, glycolic, lactic, oxalic, malonic, maleic, fumaric, malic, tartaric, citric, hydroxymaleic, dihydroxymaleic, benzoic, salicylic, 4-aminosalicylic, methane sulfonic, ethane sulfonic or hydroxyethane sulfonic acid.

The new thiazolidine derivatives, the salts thereof and mixtures of these compounds inhibit the growth of different types of *Mycobacteria*, such as *Mycobacterium tuberculosis*, e.g. the human pathogenic strain H 37 Rv of *Mycobacterium tuberculosis*, or *Mycobacterium leprae*, and may be used as antitubercular or antileprotic agents. For example, a good tuberculostatic activity may be obtained with 2-phenyl-imino-3-phenyl-thiazolidine derivatives, in which one of the phenyl radicals contains in 4-position an alkoxy group having from 4 to 5 carbon atoms, and the other phenyl radical contains in 4-position a 2-pyridyl or a 2-(2-pyridyl)-ethenyl group.

The new compounds of this invention may be used as medicaments in the form of pharmaceutical preparations, which contain the new compounds, salts thereof or mixtures of these compounds in admixture with a pharmaceutical organic or inorganic, solid or liquid carrier suitable for enteral, e.g. oral, or parenteral administration. For making up the preparations there may be employed substances which do not react with the new compounds, such as water, gelatine, lactose, starches, stearic acid, magnesium stearate, stearyl alcohol, talc, vegetable oils, benzyl alcohols, gums, waxes, propylene glycol, polyalkylene glycols, petroleum jelly or any other known carrier for medicaments. The pharmaceutical preparations may be, for example, in solid form, as tablets, dragees, or capsules, or in liquid form, for example, as solutions or emulsions. If desired, they may contain auxiliary substances, such as preserving agents, stabilizing agents, wetting or emulsifying agents, salts for varying the osmotic pressure or buffers. They may also contain, in combination, other therapeutically useful substances, particularly other antitubercular agents, such as, for example, 4-amino-salicylic acid, isonicotinic acid hydrazide, streptomycin or dihydrostreptomycin, or antileprotic agents, for example, sulfones, e.g. thiazolsulfone.

The new compounds, the salts thereof and mixtures of such compounds may be prepared by reacting a 1,3-diphenyl-2-thiourea, in which one of the phenyl radicals contains in the 4-position a group of the formula $$Py-[C(R)=CH]_n-$$

in which Py, R and $n$ have the above-given meaning and the other phenyl group contains in the 4-position an N,N-di-lower alkyl-amino-lower alkoxy group, or particularly an alkoxy group having from 4 to 5 carbon atoms, with a reactive ester of 1,2-ethanediol, and, if desired, converting a resulting salt into the base, and/or, if desired, converting a resulting base into the salts thereof, and/or, if desired, separating a resulting mixture into the single compounds.

A reactive ester of 1,2-ethanediol is particularly an ester with a strong inorganic acid, such as a hydrohalic acid, e.g. hydrochloric, hydrobromic or hydriodic acid; or sulfuric acid; or with a strong organic acid, such as an organic sulfonic acid, e.g. p-toluene sulfonic acid. 1,2-dichloroethane, and particularly 1,2-dibromoethane are the preferred reactants. The reaction may be carried out in the absence of a solvent by using an excess of the liquid reactive ester of 1,2-ethanediol as the solvent, and is completed by heating, for example, to the boiling point of the ester.

The reaction may result in a product which is a mixture of two isomeric compounds; such mixture may be separated into the single compounds, for example, by fractionated crystallization, adsorption and fractionated elution, etc. The mixture may also be used as such.

The starting materials used in the above reaction may be prepared according to known procedures for the manufacture of 1,3-diphenyl-substituted 2-thioureas, i.e. by reacting an appropriately substituted phenylisothiocyanate with a substituted aniline. For example, 4-isopentyloxyphenylisothiocyanate may be reacted with 4-(2-pyridyl)-aniline or 4-[2-(2-pyridyl)-ethenyl]-aniline to form the desired 1 - (4 - isopentyloxy - phenyl) - 3 - [4 - (2 - pyridyl)-phenyl]-2-thiourea and 1-(4-isopentyloxy-phenyl) - 3 - {4 - [2 - (2 - pyridyl) - ethenyl] - phenyl} - 2 - thiourea, respectively. The thioureas may also be used in the form of their acid addition salts.

Depending on the conditions the new compounds are obtained in the form of the free bases or as the salts thereof. A salt may be converted into the free base in the customary way, for example, by reaction with an aqueous alkaline reagent, such as an alkali metal hydroxide, e.g. sodium or potassium hydroxide; an alkali metal carbonate, e.g. sodium carbonate or potassium hydrogen carbonate; or ammonia. A free mase may be transformed into its therapeutically acceptable acid addition salts by reaction with an appropriate inorganic or organic acid, such as one of those outlined above, for example, in a lower alkanol, e.g. methanol, ethanol, propanol or isopropanol, solution. A reaction product may also be obtained as a hydrate; mono- or polysalts may be formed.

This is a continuation-in-part application of my application Serial No. 776,686, filed November 28, 1958 (now abandoned), which in turn is a continuation-in-part application of my application Serial No. 714,939, filed February 13, 1958 (now abandoned).

The following examples illustrate the invention and are not to be construed as being limitations thereon. The temperatures are given in degrees centigrade.

Example 1

A mixture of 18.8 g. of 1-(4-isobutyloxy-phenyl)-3-[4-(2-pyridyl)-phenyl]-2-thiourea and 40 ml. of 1,2-dibromoethane is heated to 130° for 40 minutes. On addition of an excess of ether a precipitate is formed, which is triturated with ethanol containing ammonia. The mixture of 2-(4-isobutyloxy-phenyl)-imino-3-[4-(2-pyridyl)-phenyl]-thiazolidine and 3-[4-(2-pyridyl)-phenyl]-imino-3-(4-isobutyloxy-phenyl)-thiazolidine crystallizes, and may be separated into the two single compounds by fractionated crystallization.

Example 2

By heating 19.5 g. of 1-(4-isopentyloxy-phenyl)-3-[4-(2-pyridyl)-phenyl]-2-thiourea in 40 ml. of 1,2-dibromoethane to 130–140° and working up the reaction product according to the procedure of Example 1, the mixture of 2-(4-isopentyloxy-phenyl)-imino-3-[4-(2-pyridyl)-phenyl]-thiazolidine and 2-[4-(2-pyridyl)-phenyl]-imino-3-(4-isopentyloxy-phenyl)-thiazolidine is obtained, which may be separated into the two single compounds.

The starting material may be prepared as follows: A solution of 3.4 g. of 4-(2-pyridyl)-aniline and 4.4 g. of 4-isopentyloxy-phenylisothiocyanate in 15 ml. of methanol is refluxed for fifteen minutes. The white precipitate, formed upon chilling, is filtered off and washed with ether. A second crop of crystalline material is obtained by diluting the filtrate with ether. The combined crops are dissolved in chloroform, the solution filtered through silicic acid and the filtrate diluted with pentane. The crystalline 1-(4-isopentyloxy-phenyl)-3-[4-(2-pyridyl)-phenyl]-2-thiourea is filtered off, washed with pentane and dried, M.P. 128–128.5°; yield: 2.9 g.

Example 3

The mixture of 2-(4-n-butyloxy-phenyl)-imino-3-[4-(3-pyridyl)-phenyl]-thiazolidine and 2-[4-(3-pyridyl)-phenyl]-imino-3-(4-butyloxy-phenyl)-thiazolidine may be obtained by heating 9.4 g. of 1-(4-n-butyloxy-phenyl)-3-[4-(3-pyridyl)-phenyl]-2-thiourea with 25 ml. of 1,2-dibromoethane according to the procedure described in Example 1, and the mixture may be separated into the single compounds by fractionated crystallization.

Example 4

A mixture of 12.1 g. of 1-(4-n-butyloxy-phenyl)-3-{4-[2-(2-pyridyl)-ethenyl]-phenyl}-2-thiourea and 7 g. of 1,2-dibromoethane is heated to 130° for 40 minutes. On addition of an excess of ether a precipitate is formed, which is triturated with ethanol containing ammonia. The mixture of 2-(4-n-butyloxy-phenyl)-imino-3-{4-[2-(2-pyridyl)-ethenyl]-phenyl}-thiazolidine and 2-{4-[2-(2-pyridyl)-ethenyl]-phenyl}-imino-3-(4-n-butyloxy-phenyl)-thiazolidine crystallizes, and may be separated into the two single compounds by fractionated crystallization.

The starting material may be prepared as follows: A mixture of 7.9 g. of 4-[2-(2-pyridyl)-ethenyl]-aniline and 10.4 g. of 4-n-butyloxy-phenylisothiocyanate in 120 ml. of methanol is refluxed on the steam bath. A yellow precipitate forms after 5 minutes, and the reaction mixture is cooled after an additional two hours of refluxing. The solid material is filtered off and the 1-(4-n-butyloxy-phenyl)-3-{ 4-[2-(2-pyridyl)-ethenyl]-phenyl }-2-thiourea hemihydrate is recrystallized from anhydrous ethanol, M.P. 168–169°; yield: 11.0 g.

Example 5

By heating 12.6 g. of 1-(4-isopentyloxy-phenyl)-3-{4-[2-(2-pyridyl)-ethenyl]-phenyl}-2-thiourea with 7 g. of 1,2-dibromoethane and working up the reaction product according to the procedure of Example 1, the mixture of 2 - (4 - isopentyloxy - phenyl) - imino - 3 - {4 - [2 - (2-pyridyl)-ethenyl]-phenyl}-thiazolidine and 2-{4-[2-(2-pyridyl) - ethenyl - phenyl} - imino - 3 - (4 - isopentyloxy-phenyl)-thiazolidine is obtained, which may be separated into the two single compounds.

The starting material may be prepared as follows: A solution of 7.9 g. of 4-[2-(2-pyridyl)-ethenyl]-aniline and 8.9 g. of 4-isopentyloxy-phenylisothiocyanate in a mixture of 20 ml. of methanol and 50 ml. of ethanol is refluxed on the steam bath of 3½ hours. The white precipitate, formed upon chilling, is filtered off and recrystallized from a mixture of isopropanol and ethanol to yield 6 g. of 1-(4 - isopentyloxy - phenyl) - 3 - {4 - [2 - (2 - pyridyl)-ethenyl]-phenyl}-2-thiourea, M.P. 143.5–146°.

Example 6

The mixture of 2-(4-isobutyloxy-phenyl)-imino-3-{4-[2-(2-pyridyl)-ethenyl]-phenyl}-thiazolidine and 2-{4-[2-(2 - pyridyl) -ethenyl] - phenyl} - imino - 3 - (4 - isobutyloxy-phenyl)-thiazolidine may be obtained by heating 25 g. of 1-(4-isobutyloxy-phenyl)-3-{4-[2-(2-pyridyl)-ethenyl]-phenyl}-2-thiourea with 14 g. of 1,2-dibromoethane according to the procedure described in Example 1, and the mixture may be separated into the single compounds by fractionated crystallization.

The hydrochloride may be prepared by treating an alcohol solution of the base with hydrogen chloride and precipitating the resulting salt by the addition of ether.

The starting material may be prepared as follows: 7.9 g. of 4-[2-(2-pyridyl)-ethenyl]-aniline is dissolved in a mixture of 120 ml. of methanol and 75 ml. of ethanol, 10.5 g. of 4-isobutyloxy-phenylisothiocyanate is added to the warm solution, and the mixture is refluxed for three hours on the steam bath. The solution is concentrated to one-third of its original volume, the precipitate is filtered off after chilling and is washed with isopropanol. The resulting 1-(4-isobutyloxy-phenyl)-3-{4-[2-(2-pyridyl)-ethenyl]-phenyl}-2-thiourea is recrystallized from aqueous methanol, M.P. 139°.

The reaction of 4-(2-diethylaminoethoxy)-phenylisothiocyanate with 4 - (4 - pyridyl) - aniline furnishes the 1 - [4 - (2 - diethylaminoethoxy) - phenyl] - 3 - [4 - (4-pyridyl)-phenyl]-2-thiourea, which upon treatment with 1,2-dibromoethane yields a mixture of 2-[4-(2-diethylaminoethoxy) - phenyl] - imino - 3 - [4 - (4 - pyridyl)-phenyl]-thiazolidine and 2-[4-(4-pyridyl)-phenyl]-imino-3 - [4 - (2 - diethylaminoethoxy) - phenyl] - thiazolidine. Likewise, 4 - n - butyloxy - phenylisocyanate and 4 - [4-(2 - pyridyl) - butadienyl] - aniline yield the 1 - (4 - n-butyloxy - phenyl) - 3 - {4 - [4 - (2 - pyridyl) - butadienyl]-phenyl}-2-thiourea, which is converted to a mixture of 2 - (4 - n - butyloxy - phenyl) - imino - 3 - {4-[4 - (2 - pyridyl) - butadienyl] - phenyl} - thiazolidine and 2 - {4 - [2 - pyridyl) - butadienyl] - phenyl} - imino-3-(4-n-butyloxy-phenyl)-thiazolidine by reacting it with 1,2-dibromoethane.

Example 7

The reaction of 1-(4-isopentyloxy-phenyl)-3-{4-[2-methyl -(2 - pyridyl) - ethenyl] - phenyl} - 2 - thiourea and 1,2-dibromoethane according to the previously-given procedures yields a mixture of 2-(isopentyloxy-phenyl)-imino - 3 - {4 - [2 - methyl - 2 - (2 - pyridyl) - ethenyl]-phenyl} - thiazolidine and 2 - {4 - [2 - methyl - 2 - (2- pyridyl) - ethenyl] - phenyl} - imino - 3 - (4 - isopentyl-oxy-phenyl)-thiazolidine, which may be separated by fractionated crystallization.

The starting material used in the above reaction may be prepared as follows: A mixture of 53.5 g. of 2-ethyl-pyridine, 75.6 g. of p-nitrobenzaldehyde and 52 g. of acetic acid anhydride is refluxed for seven hours. The cold mixture is poured into dilute aqueous hydrochloric acid, and made slightly basic with aqueous ammonia while stirring. The yellow 4-[2-methyl-2-(2-pyridyl)-ethenyl]-nitrobenzene is filtered off, washed, air dried and recrystallized from 95 percent ethanol, M.P. 98–100.5°; yield: 84 percent.

To a solution of 343 g. of stannous chloride in 535 ml. of concentrated aqueous hydrochloric acid is added 101 g. of 4-[2-methyl-2-(2-pyridyl)-ethenyl]-nitrobenzene; a light colored paste is formed and heating is continued for one and one-half hours. The mixture is chilled, filtered, the solid material is washed and added to concentrated aqueous hydrochloric acid. The resulting suspension is poured into aqueous sodium hydroxide, so that the final pH=10–11, and the precipitate is filtered off, washed thoroughly with water and dried on the funnel. The solid material is extracted with ethanol in a Soxhlet apparatus, the solvent is evaporated and the light tan-colored 4-[2-methyl-2-(2-pyridyl)-ethenyl]-aniline is recrystallized from isopropanol, M.P. 118.5°; yield: 43 g.

A solution of 11.1 g. of 4-isopentyloxy-phenylisothiocyanate and 10.5 g. of 4-[2-methyl-2-(2-pyridyl)-ethenyl]-aniline in 100 ml. of anhydrous ethanol is refluxed for three hours, then filtered hot and the filtrate is chilled. The resulting 1-(4-isopentyloxy-phenyl)-3-{4-[2-methyl-2-(2-pyridyl)-ethenyl]-phenyl}-2-thiourea is filtered off, washed with a 1:1-mixture of ethanol and petroleum ether and recrystallized from isopropanol, M.P. 124.5–125.5°; yield: 15 g.

*Example 8*

A mixture of 2-(4-isobutyloxy-phenyl)-imino-3-{4-[2 - methyl - 2 - (2 - pyridyl) - ethenyl] - phenyl} - thiazolidine and 2 - {4 - [2 - methyl - 2 - (2 - pyridyl)-ethenyl] - phenyl} - imino - 3 - (4 - isobutyloxyphenyl)-can be obtained by reacting 1-(4-isobutyloxyphenyl)-3-{4 - [2 - methyl - 2 - (2 - pyridyl) - ethenyl] - phenyl}-2-thiourea with 1,2-dibromoethane according to the previously given procedure; the mixture may be separated into the single components by fractionated crystallization.

The starting material may be prepared as follows: A mixture of 10.4 g. of 4-isobutyloxy-phenylisothiocyanate and 10.5 g. of 4-[2-methyl-2-(2-pyridyl)-ethenyl]-aniline in 75 ml. of ethanol is refluxed for three hours. Crystals are formed upon chilling and adding isopropanol; the 1 - (4 - isobutyloxy - phenyl) - 3 - {4 - [2 - methyl-2-(2-pyridyl)-ethenyl]-phenyl}-2-thiourea is filtered off, washed with isopropanol, M.P. 113–114°; yield: 11 g.

What is claimed is:

1. A member of the group consisting of 2-phenyl-imino-3-phenyl-thiazolidine, in which one of the phenyl radicals is substituted in the 4-position by a member of the group consisting of alkoxy having from 4 to 5 carbon atoms and N,N-di-lower alkyl-amino-lower alkoxy, and the other phenyl radical is substituted in the 4-position by a group of the formula Py—[C(R)=CH]$_n$—, in which Py stands for a member of the group consisting of 2-pyridyl, 3-pyridyl and 4-pyridyl, R represents a member of the group consisting of hydrogen and lower alkyl, and $n$ stands for a whole number from 0 to 2, and therapeutically useful acid addition salts thereof.

2. 2-phenyl-imino-3-phenyl-thiazolidine, in which one of the phenyl radicals is substituted in the 4-position by alkoxy having from 4 to 5 carbon atoms and the other phenyl radical is substituted in the 4-position by 2-pyridyl.

3. 2 - (4 - isobutyloxy - phenyl) - imino - 3 - [4 - (2-pyridyl)-phenyl]-thiazolidine.

4. 2 - [4 - (2 - pyridyl) - phenyl] - imino - 3 - (4 - iso-butyloxy-phenyl)-thiazolidine.

5. 2 - (4 - isopentyloxy - phenyl) - imino - 3 - [4 - (2-pyridyl)-phenyl]-thiazolidine.

6. 2 - [4 - (2 - pyridyl) - phenyl] - imino - 3 - (4 - iso-pentyloxy-phenyl)-thiazoline.

7. 2-phenyl-imino-3-phenyl-thiazolidine, in which one of the phenyl radicals is substituted in 4-position by alkoxy having from 4 to 5 carbon atoms and the other phenyl radical is substituted in the 4-position by 2-(2-pyridyl)-ethenyl.

8. 2 - (4 - isopentyloxy - phenyl) - imino - 3 - {4 - [2-(2-pyridyl)-ethenyl]-phenyl}-thiazolidine.

9. 2 - {4 - [2 - (2 - pyridyl) - ethenyl] - phenyl}-imino-3-(4-isopentyloxy-phenyl)-thiazolidine.

10. 2 - (4 - isobutyloxy - phenyl) - imino - 3 - {4 - [2-(2-pyridyl)-ethenyl]-phenyl}-thiazolidine.

11. 2 - {4 - [2 - (2 - pyridyl) - ethenyl] - phenyl}-imino-3-(4-isobutyloxy-phenyl)-thiazolidine.

References Cited in the file of this patent

UNITED STATES PATENTS 2,877,232   Huebner _____ Mar. 10, 1959

OTHER REFERENCES

Chemical Abstracts, vol. 33, pp. 5394 to 5395 (1939). (Abstract of Dashen et al., Trans. Kansas Acad. Science, vol. 40, pp. 103 to 107 (1937).)

Dains et al.: Journal of the American Chemical Society, vol. 47, pp. 1987 to 1988 (1925).

UNITED STATES PATENT OFFICE
CERTIFICATION OF CORRECTION

Patent No. 2,949,462            August 16, 1960

Charles Ferdinand Huebner

It is hereby certified that error appears in the above numbered patent requiring correction and that the said Letters Patent should read as corrected below.

Column 2, line 72, for "mase" read -- base --; column 4, line 59, for "phenylisocyanate" read -- phenylisothiocyanate --; column 5, lines 43 and 44, for "(4-isobutyloxyphenyl)- can be" read -- (4-isobutyloxyphenyl)-thiazolidine can be --.

Signed and sealed this 22nd day of August 1961.

(SEAL)
Attest:

ERNEST W. SWIDER
Attesting Officer

DAVID L. LADD
Commissioner of Patents